United States Patent

Oike

[19]

[11] Patent Number: 5,884,654
[45] Date of Patent: Mar. 23, 1999

[54] CONDENSATE DISCHARGE DEVICE

[75] Inventor: Tadashi Oike, Kakogawa, Japan

[73] Assignee: TLV Co., Ltd., Kakogawa, Japan

[21] Appl. No.: 813,142

[22] Filed: Mar. 7, 1997

[30] Foreign Application Priority Data

Mar. 15, 1996 [JP] Japan .................................. 8-087411
Aug. 13, 1996 [JP] Japan .................................. 8-232580

[51] Int. Cl.$^6$ ................................ F16T 1/10; F16T 1/34; F16T 1/38
[52] U.S. Cl. .......................... 137/177; 55/466; 137/183; 137/244; 138/44; 251/120; 236/58
[58] Field of Search ............... 55/466; 137/177, 137/183, 244; 138/44; 251/120; 236/58

[56] References Cited

U.S. PATENT DOCUMENTS

| 103,184 | 5/1870 | Hodges | 137/177 |
|---|---|---|---|
| 726,395 | 4/1903 | Bedworth et al. | 138/44 X |
| 1,089,187 | 3/1914 | Brown | 137/183 X |
| 1,937,555 | 12/1933 | Estler | 138/44 |
| 2,096,807 | 10/1937 | Hulbert | 138/44 |
| 3,769,999 | 11/1973 | Flanagan et al. | 137/183 |
| 4,171,209 | 10/1979 | Brown | 55/466 |
| 4,592,381 | 6/1986 | Troy | 137/183 X |
| 5,167,251 | 12/1992 | Kirstein | 137/244 |
| 5,405,078 | 4/1995 | Yumoto | 236/58 |

FOREIGN PATENT DOCUMENTS 0 016 241  10/1980  European Pat. Off. .

*Primary Examiner*—Gerald A. Michalsky
*Attorney, Agent, or Firm*—Kenyon & Kenyon

[57] ABSTRACT

A condensate discharge device which prevents metal ions from attaching and depositing on the condensate discharge port surface. An inlet, a condensate discharge port, and an outlet are formed in a valve casing, which valve casing includes an upper casing and a lower casing. A valve seat member having a discharge passage is screwed into the lower casing. The discharge passage includes a first orifice having a smaller opening area than the condensate discharge port, and a second orifice having a smaller opening area than the first orifice. A movable member is mounted through the second orifice. On end of the movable member rests on one side of the second orifice, and another end is located on the other side of the second orifice. Condensate flows slowly through the condensate discharge port, preventing metal ions from attaching there, and flows rapidly through the second orifice. Any metal ions attaching to the second orifice are removed by moving action of the movable member, which moving action is caused by flow of condensate around the movable member.

12 Claims, 2 Drawing Sheets

CONDENSATE DISCHARGE DEVICE

BACKGROUND OF THE INVENTION

1. Field of the Invention

The present invention relates to a condensate discharge device for automatically discharging a condensate generated in equipment using steam, a steam piping system used in steam handling equipment, or in a steam pipeline, and in particular for to an apparatus preventing metal ions dissolved in fluid from accumulating on a condensate discharge port surface of a discharge passage and thereby blocking up the condensate discharge port.

2. Description of the Prior Art

In a steam piping system, the generation of condensate is unavoidable, and it is necessary to discharge the condensate out of the system in some manner. A device for automatically discharging the condensate from a steam piping system is a special valve called a steam trap.

A steam trap may be classified into three categories: a mechanical type, driven on the basis of the principle of a valve member and utilizing the difference in specific gravity between steam and condensate; a thermodynamic type, utilizing the difference in thermodynamic characteristics between the steam and the condensate; and a thermostatic type, utilizing the difference in temperature between the steam and the condensate. According to the basic constitution of such steam traps, an inlet, a valve chamber, and an outlet are formed in a valve casing; a condensate discharge port is formed, connecting the valve chamber and the outlet to the valve casing or to a valve seat member mounted to the valve casing; and the valve member is disposed within the valve chamber so that the condensate flowing from the upstream pipe—connected with the inlet by the valve member opening and closing the condensate discharge port—is automatically discharged to the outlet. The material of the valve casing is generally a ferrous metal, such as cast iron, cast steel, etc.; the valve seat member forming the condensate discharge port is generally formed of a stainless steel with abrasion-resistance taken into consideration. When the valve port formed in the valve casing or when the valve casing is small, the valve casing is generally made of a stainless steel.

EPO Patent Application No. 0 016 241 shows a device for removing condensate from steam lines, steam systems, and other systems wherein a liquid must be removed. The device in that patent application includes an orifice which allows the removal of liquids through the orifice but not the escape of steam or gas through the orifice.

SUMMARY OF THE INVENTION

The above-described steam trap has the problem that metal ions dissolved in the fluid and flowing into the valve chamber are deposited on the condensate discharge port surface, blocking the condensate discharge port. For example, when the upstream pipe is made of a copper, copper ions dissolved from the copper pipe are deposited on the condensate discharge port surface formed of the stainless steel. Since the condensate discharge port has a considerably small surface area as compared with the sectional area of the pipe, the fluid being discharged flows at a high velocity, causing the metal ions dissolved into the discharge fluid to penetrate into the surface of the condensate discharge port. The present invention provides a condensate discharge device which can prevent metal ion accumulation on the condensate discharge port surface.

In the present invention, an orifice having a smaller opening area than the condensate discharge port is formed at the downstream side of the condensate discharge port, and a movable member is inserted through the orifice, partly positioned at the upstream end of the orifice. Thus the pressure at the condensate discharge port is kept at a high pressure close to the pressure at the upstream side, allowing gradual downflow of the condensate in the condensate discharge port. The metal ions, therefore, will not attach to the surface of the condensate discharge port. The condensate flows at a high velocity in the orifice—or in an orifice located at the extreme downstream side when a plurality of orifices arranged in series are used—so that the metal ions will attach to the surface of the orifice. However, the metal ions attaching to the surface of the orifice are removed by the movable member moving with the condensate stream, and will not deposit on the surface of the orifice. The metal ions that have been removed flow away downstream together with the condensate.

DETAILED DESCRIPTION OF THE INVENTION

Figure 1:
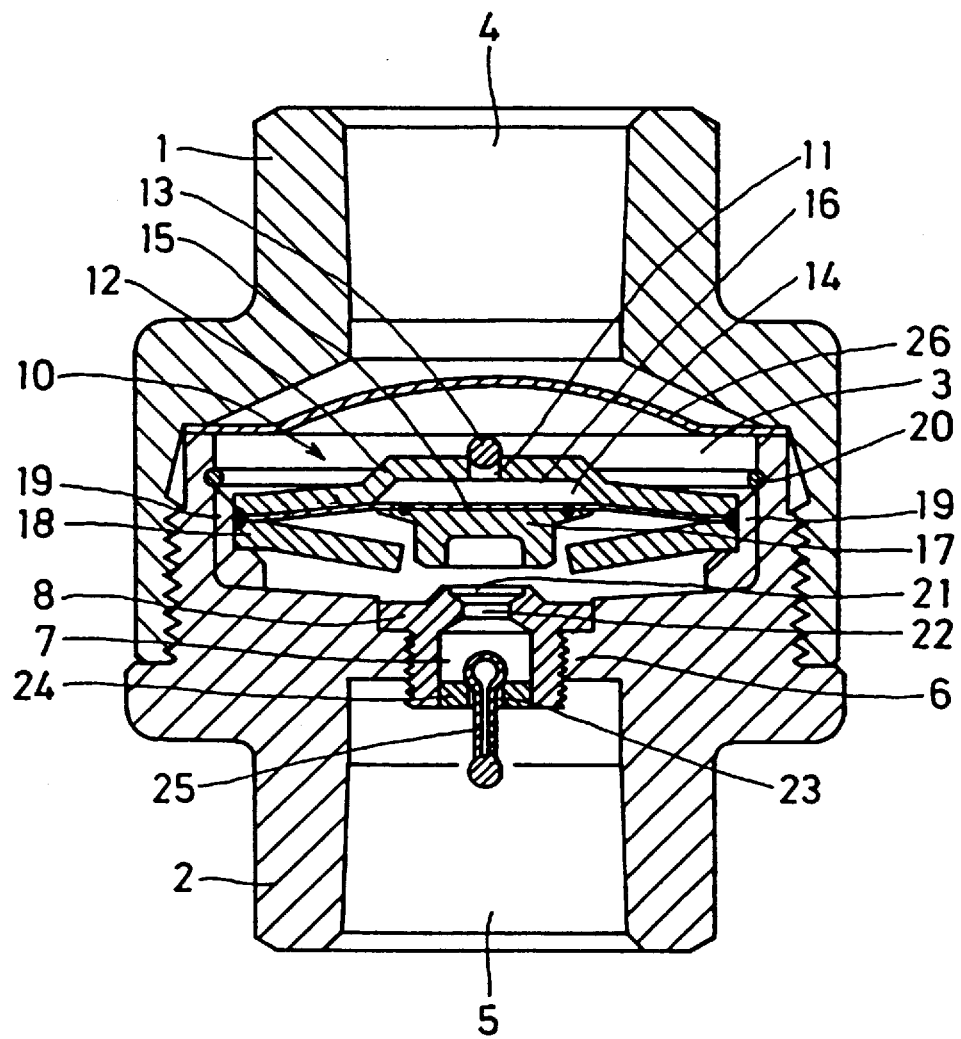
FIG. 1 is a sectional view of an embodiment of the thermally actuated condensate discharge device according to the present invention.

A first embodiment of the present invention is shown in FIG. 1, which may be used in a thermally actuated steam trap. A valve casing, with a valve chamber 3 inside, is formed by connecting, by screws or other known attachment mechanisms, an upper casing 1 to a lower casing 2. An inlet 4 is formed in the upper casing 1 and an outlet 5 in the lower casing 2. The inlet 4 and the outlet 5 are formed coaxially. In a horizontal wall 6 of the lower casing 2, a valve seat member 8 having a discharge passage 7 communicates with the valve chamber 3 and is connected to the outlet 5 by screw threading. The upper casing 1, the lower casing 2, and the valve seat member 8 are all preferably made of stainless steel.

Above the valve seat member 8, a temperature control element 10 is located. The temperature control element 10 includes a wall member 12 having a filler port 11, a plug member 13 for sealing the filler port 11, a diaphragm 15 defining a holding chamber 14 between the wall member 12 and the diaphragm 15, an expansion medium 16 sealed in the holding chamber 14, a valve member 17 secured on the diaphragm 15, and a fastening wall member 18 for fastening the outer peripheral edge of the diaphragm 15 between the wall member 12 and the fastening wall member 18. The valve member 17 includes a valve section which seats on, and moves away from, the valve seat member 8 to open and close the discharge passage 7. The temperature control element 10 is held by a snap ring 20 secured on the inner periphery of the lower casing 2, and the outer periphery of the lower surface of the fastening wall member 18 is formed on the inner periphery of the lower casing 2, in contact with a stepped part of a plurality of ribs 19. The temperature control element 10 and the snap ring 20 are both preferably made of stainless steel. The expansion medium 16 is water, a liquid having a lower boiling point than water, or a mixture of water and such a liquid.

The discharge passage 7 in the valve seat member 8, formed successively from the valve chamber 3 side to the outlet 5 side, includes a condensate discharge port 21, a first orifice 22 having a smaller opening area than the condensate discharge port 21, and a second orifice 23 having a smaller opening area than the first orifice 22. The second orifice 23 is formed in an orifice member 24 pressed in and secured to the discharge passage 7. A movable member 25 is arranged through the second orifice 23. The movable member 25 is made of a thin long rod having a circular part at the upper end which has a larger inside diameter than the second orifice 23 and a welded ball-shaped part at the lower end which has a larger outside diameter than the second orifice 23. The circular part of the movable member 25 rests on the upper end of the second orifice 23, while the ball-shaped part is located beneath the second orifice 23. The second orifice member 24 and the movable member 25 are preferably made of stainless steel. Reference numeral 26 denotes a screen.

Operation of the above-described thermally actuated steam trap is as follows. When a cold fluid flows into the valve chamber 3 at the inlet 4, the expansion medium 16 contracts to cause the diaphragm 15 to displace to the wall member 12 side, moving the valve member 17 away from the valve seat member 8 to thereby open the discharge passage 7. Thus, the condensate is discharged from the discharge passage 7 to the outlet 5. At this time, the first and second orifices 22 and 23 are open, allowing the discharge fluid to flow slowly through the condensate discharge port 21. Similarly, the second orifice 23 opens to thereby allow the discharge fluid to flow slowly through the first orifice 22. Therefore, metal ions dissolved in the fluid will not attach to the surface of the condensate discharge port 21 and the first orifice 22. The discharge fluid flows at a high velocity through the second orifice 23, because of its comparatively small area, allowing metal ions to attach to the surface of the second orifice 23. The metal ions attaching to the surface of the second orifice 23, however, will not deposit there because they are removed by the movable member 25, which movable member 25 is turned by flow of the discharge fluid. The metal ions so removed flow away together with the discharge condensate to the outlet 5.

When steam flows into the valve chamber 3 with the discharge of the condensate, the expansion medium 16 expands to displace the diaphragm 15 toward the fastening wall member 18 side, thereby seating the valve member 17 on the valve seat member 8 to close the discharge passage 7 and accordingly to prevent the outflow of steam.

It should be noted that, in the embodiment described above, a thermally actuated steam trap has been given as an example; however, the present invention is applicable to other types of steam traps, such as a float type, disk type, etc.

Figure 2:
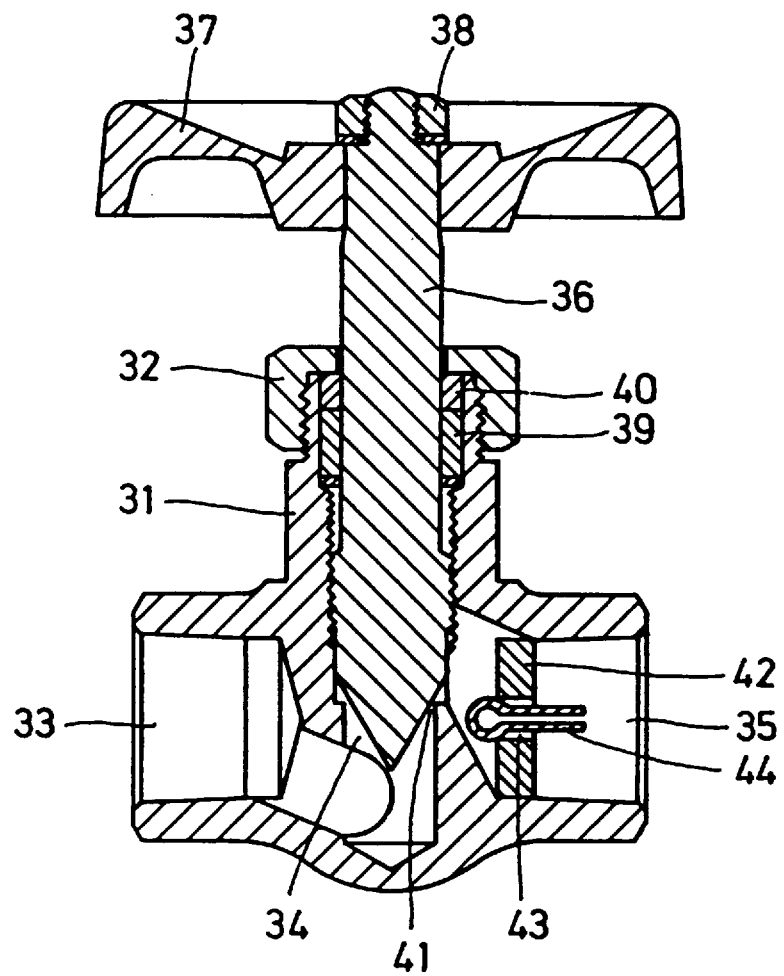
FIG. 2 is a sectional view of another embodiment of the condensate discharge device of the present invention.

A second embodiment of the present invention is shown in FIG. 2. In the embodiment of FIG. 2, the present invention has been applied to a needle valve. A valve casing is formed by mounting a packing retaining nut 32 by a screw to a valve body 31. In the valve body 31 are formed an inlet 33, a discharge passage 34, and an outlet 35. The inlet 33 and the outlet 35 are coaxially formed. The valve body 31 and the packing retaining nut 32 are preferably made of stainless steel.

A valve rod 36 is threadedly mounted in the valve body 31, in such manner that it can move inwardly and outwardly. The top portion of the valve rod 36 is inserted through the packing retaining nut 32; on the top end of the valve rod 36 a turning handwheel 37 is secured by a nut 38. Between the valve body 31 and the valve rod 36 a packing 39 and a packing holder 40 are disposed and fastened by the packing retaining nut 32. The valve rod 36 is set by the turning of the handwheel 37 in such a position where a small condensate discharge port 41 is formed between the valve portion at the lower end and the discharge passage 34 so that only condensate can be discharged, without steam leakage. The valve rod 36 and the packing holder 40 are preferably made of stainless steel, and the packing 39 is preferably made of fluoroplastic.

At the outlet 35 an orifice member 42 is pressed in and fixed. The orifice member 42 has an orifice 43 which has a smaller opening area than the condensate discharge port 41. A movable member 44 is disposed through the orifice 43. The movable member 44 has a round portion made larger in diameter than the orifice 42 on the left by bending a slender rod. The orifice member 42 and the movable member 44 are preferably made of stainless steel.

Operation of the above-described condensate discharge device is as follows. The condensate flows down slowly in the condensate discharge port 41 due to the relatively large size of the orifice 43. The metal ions dissolved in the condensate, therefore, will not adhere to the surface of the condensate discharge port 41. The metal ions that adhere to the surface of the orifice 43 are removed by the movable member 44, and flow away together with the condensate to the outlet 35.

In the above-described embodiment, the condensate discharge device applied to the needle valve has been exemplified; the present invention, however, may be applied to other types of valves.

Figure 3:
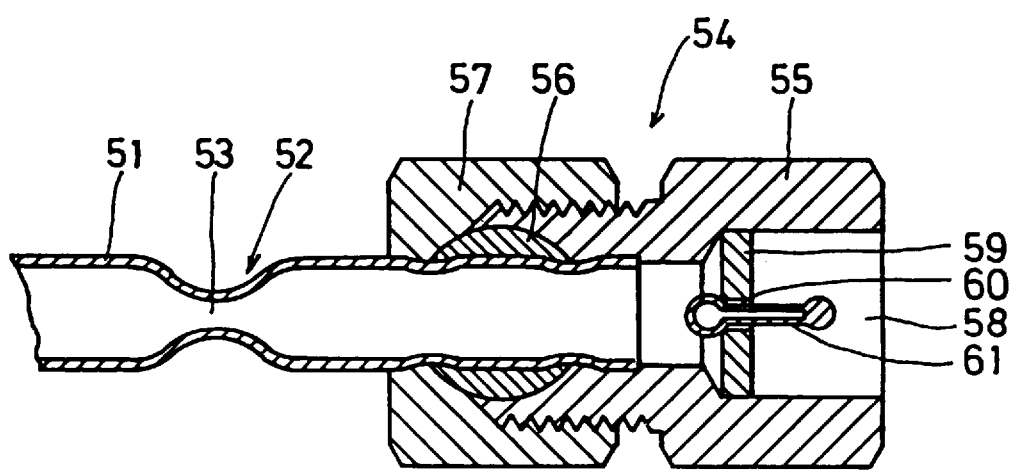
FIG. 3 is a sectional view of further embodiment of the condensate discharge device of the present invention.

A further embodiment of the present invention is shown in FIG. 3. The embodiment of FIG. 3 is a condensate discharge device in which a throttle section is inserted in the piping and a condensate discharge port having a small passage area is formed. A throttle section 52 is formed in the condensate discharge pipe 51, thereby forming a condensate discharge port 53 having a small passage area. The condensate discharge port 53 is so formed as to have a flow passage area as to allow discharge of only the condensate without leaking the steam. The condensate discharge pipe 51 is preferably made of a copper pipe or a steel pipe.

A copper-alloy ring joint 54 consisting of a body 55, a ring 56 and a ring nut 57 is connected to the end of the condensate discharge pipe 51. In the outlet 58 formed in the body 55 an orifice member 59 is pressed in and fixed. In the orifice member 59, an orifice 60 having a smaller opening area than the condensate discharge port 53 is formed. A movable member 61 is disposed through the orifice 60. The movable member 61 is made of a thin long rod which is bent to form a circular part at the left end having a larger inside diameter than the orifice 60 and a welded ball-shaped part at the right end having a larger outside diameter than the orifice 60. The orifice member 59 and the movable member 61 are preferably made of stainless steel.

The condensate flowing downward through the condensate discharge port 53 gradually flows downward through the condensate discharge port 53. The condensate flows at high velocity through the orifice 60. Metal ions attaching to the surface of the orifice 60 are removed by the movable member 61, flowing away together with the condensate to the outlet 58.

The embodiments of FIGS. 2 and 3 remove condensate generally in the manner disclosed in EPO Patent Application No. 0 016 241.

In the present invention, since no metal ions will hold and deposit on the surface of the condensate discharge port, the discharge flow rate will not be decreased and furthermore the condensate discharge port will not be blocked. It is, therefore, possible to keep the primary function of the condensate discharge device for a prolonged period of time.

From the above description of the invention, those skilled in the art will perceive improvements, changes and modifications. Such improvements, changes and modifications within the skill of the art are intended to be covered by the appended claims.

What is claimed is:

1. A condensate discharge device comprising:

a valve casing, the valve casing including an inlet, a condensate discharge port and an outlet, the inlet being connected to an upstream pipe, the valve casing further including a discharge passage connecting the outlet to the condensate discharge port, the condensate discharge port including an opening area, the valve casing further including a control element, the control element opening and closing the condensate discharge port;

an orifice having a smaller opening area than the opening area of the condensate discharge port, the orifice being located downstream of the condensate discharge port; and a movable member partly positioned in an upstream end of the orifice and passing through the orifice.

2. The condensate discharge device of claim 1, wherein:

the movable member includes a rod which is bent to form a circular part having a larger diameter than a diameter of the orifice.

3. The condensate discharge device of claim 2, wherein:

the movable member further includes a welded ball-shaped part having a larger diameter than the diameter of the orifice.

4. The condensate discharge device of claim 1, wherein:

the condensate discharge port includes a throttle section.

5. The condensate discharge device of claim 1, wherein:

the control element is a temperature control element, the temperature control element opening and closing the condensate discharge port.

6. The condensate discharge device of claim 5, wherein:

the temperature control element includes a holding chamber filled with an expansion medium, a diaphragm defining one side of the holding chamber, and a valve member on the diaphragm, the valve member opening and closing the condensate discharge port upon contraction and expansion of the expansion medium.

7. A condensate discharge device, comprising:

a condensate discharge port having an opening area, an orifice having an opening area smaller than the opening area of the condensate discharge port, the orifice being located downstream of the condensate discharge port, a valve casing, the valve casino including a control element, the control element opening and closing the condensate discharge port, and a movable member mounted in the orifice, a portion of the movable member being positioned at an upstream end of the orifice.

8. The condensate discharge device of claim 7, wherein:

the movable member includes a rod which is bent to form a circular part having a larger diameter than a diameter of the orifice.

9. The condensate discharge device of claim 8, wherein:

the movable member further includes a welded ball-shaped part having a larger diameter than the diameter of the orifice.

10. The condensate discharge device of claim 7, wherein:

the condensate discharge port includes a throttle section.

11. The condensate discharge device of claim 7, wherein:

the control element is a temperature control element, the temperature control element opening and closing the condensate discharge port.

12. The condensate discharge device of claim 11, wherein:

the temperature control element includes a holding chamber filled with an expansion medium, a diaphragm defining one side of the holding chamber, and a valve member on the diaphragm, the valve member opening and closing the condensate discharge port upon contraction and expansion of the expansion medium.

* * * * *